UNITED STATES PATENT OFFICE.

WILLIAM W. GRISCOM, OF PHILADELPHIA, PENNSYLVANIA, ASSIGNOR TO THE ELECTRICAL ACCUMULATOR COMPANY.

SECONDARY BATTERY.

SPECIFICATION forming part of Letters Patent No. 359,072, dated March 8, 1887.

Application filed July 2, 1886. Serial No. 206,977. (No specimens.)

*To all whom it may concern:*

Be it known that I, WILLIAM W. GRISCOM, a citizen of the United States, and a resident of Philadelphia, in the county of Philadelphia and State of Pennsylvania, have invented certain new and useful Improvements in Secondary Batteries, of which the following is a specification.

My invention pertains to improvements in secondary batteries or accumulators.

Heretofore in the process of forming the plates of secondary batteries it has been the practice to apply an oxide of lead, mechanically, to the supporting-plates. Usually one of the higher oxides, as red lead, has been applied to one plate, and a lower oxide, as litharge, has been applied to the other. This was done upon the assumption that red lead can be raised to peroxide of lead, and that litharge can be reduced to spongy lead in about equal times with the same current. Such assumption, founded upon theoretical considerations, has been found to be erroneous. It has been found that with the plates prepared as stated the time required to form the spongy lead plate was four to five times that required to form the peroxide plate. This is largely due to the fact that spongy lead itself absorbs hydrogen. For example, consider the case of the lead plate mechanically coated with an oxide of lead. A charging-current liberates a molecule of hydrogen, which combines with the oxide to form water and spongy lead. This spongy lead so formed absorbs hydrogen to the extent of many times the amount required to effect the chemical change, and it therefore follows that with the plates prepared as first above stated the positive plate receives its coat of peroxide long before the negative plate becomes formed with its coating of spongy lead, and the charging-current being continued for the purpose of completing the formation of the spongy lead plate does more or less damage to the peroxidized plate already formed. To obviate this difficulty it was customary to form these two species of plates in separate tanks. This involved an extra handling and an amount of manipulation which it is desirable to avoid.

By my improved process both plates or supports are formed in the same cell and in the same position in which they are to be used; and my process of formation consists in coating both plates or supports with a lower oxide than has previously been employed for the peroxidized plate—that is, an oxide such that the completion of the formation of the two opposing plates will be substantially simultaneous with any given strength of current. For this purpose I take, for instance, two perforated lead plates, of well-known construction, and mechanically apply thereto a low oxide, preferably consisting of a paste composed of litharge, eight parts; water, three parts, and sulphuric acid one part, by weight, although a slight deviation from these proportions will produce the required result. This paste I apply to the perforated plates, which are allowed to remain exposed to air for from, say, twelve to twenty-four hours, or until by chemical action a sufficient quantity of sulphate of lead has been formed to produce the required result, and which may be determined by experience for any given quality of the ingredients. The plates so prepared I place in a cell containing dilute sulphuric acid. After connecting this cell with the charging-current for a suitable time, peroxide of lead is formed on the one plate and spongy lead on the other, the complete formation of the two plates being simultaneous, or nearly so, and the necessity for a continued application of the charging-current, to the detriment of the peroxidized plate, is avoided.

I have described the formation of but two plates. It is to be understood that I may simultaneously form a number of plates in one cell—that is, two or more positives and two or more negatives—and that by my process the complete formation of plates of both kinds may be readily and expeditiously accomplished in the same cell from which they are to deliver their charge.

What I claim, and desire to secure by Letters Patent, is—

1. A secondary battery or electrical accumulator having a pair of plates or elements, both primarily coated or combined with a paste composed of litharge, sulphuric acid, and water, which requires approximately the same time for complete peroxidation and for complete reduction on the positive and negative elements, respectively, substantially as set forth.

2. The process of forming the elements of a secondary battery or accumulator, which consists in coating two lead plates with a low oxide of lead formed of a paste consisting of litharge, water, and acid in the proportions substantially as described, and exposing the plates so coated to the action of atmospheric air, then placing them in an electrolyte and passing a charging-current therethrough, the result being that the charging-current will reduce the coating of one plate to peroxide of lead and that of the other to spongy lead in substantially equal times.

Signed at New York, in the county of New York and State of New York, this 1st day of July, A. D. 1886.

WM. W. GRISCOM.

Witnesses:
WM. B. VANSIZE,
THOMAS P. CONANT.